United States Patent [19]

Shustova et al.

[11] 4,347,175

[45] Aug. 31, 1982

[54] METHOD FOR STABILIZATION OF POLYMERS

[76] Inventors: Olga A. Shustova, Grokholsky pereulok, 30, korpus 1, kv. 41; Georgy P. Gladyshev, Vinnitskaya, ulitsa 5, kv. 111; Tamara P. Potapova, Bolshaya Cheremushkinskaya ulitsa, 1, korpus 2, kv. 64, all of Moscow, U.S.S.R.

[21] Appl. No.: 854,207

[22] Filed: Nov. 23, 1977

[51] Int. Cl.³ .............................................. C08K 5/09
[52] U.S. Cl. .................................... 523/455; 523/456; 524/398; 524/399; 524/400; 524/392
[58] Field of Search ................. 260/45.75 R, 45.75 C, 260/45.75 N, 45.75 P, 45.75 M, 45.85 R, 45.75 F, 45.75 W, 45.75 G; 526/4; 528/92, 289, 319, 336

[56] References Cited

U.S. PATENT DOCUMENTS

| 2,996,478 | 8/1961 | West | 260/45.85 R |
|---|---|---|---|
| 2,999,076 | 9/1961 | Talcott | 260/45.75 R |
| 3,082,181 | 3/1963 | Brown et al. | 260/45.75 R |
| 3,142,655 | 7/1964 | Bobear | 260/45.75 R |
| 3,163,492 | 12/1964 | Thomas | 260/45.75 R |
| 3,280,053 | 10/1966 | Twilley et al. | 260/45.75 |
| 3,965,068 | 6/1976 | Dickens | 260/45.75 F |
| 3,968,081 | 7/1976 | Dickens | 260/45.75 N |
| 3,983,185 | 9/1976 | Dorfman et al. | 260/45.75 P |
| 4,002,597 | 1/1977 | Dickens | 260/45.75 G |
| 4,013,815 | 3/1977 | Dortman et al. | 260/45.75 P |
| 4,118,441 | 10/1978 | Le Blanc | 526/4 |

OTHER PUBLICATIONS

Handbook of Chemistry and Physics–40th Edition Chemical Rubber Pub. Co. Cleveland, Ohio (1959), pp. 566 & 567.
Modern Plastics Encyclopedia–1974–1975, vol. 15, No. A, Oct. 1974, pp. 34, 90, 113, 114.

Primary Examiner—V. P. Hoke
Attorney, Agent, or Firm—Lilling & Greenspan

[57] ABSTRACT

A method for stabilization of polymers susceptible to an oxidative destruction which comprises intermixing a polymer with formate of a multi-valent metal in an amount ranging from 0.1 to 20 parts by weight per 100 parts by weight of the polymer. The resulting mixture is subjected to a heat treatment at the temperature of decomposition of the selected formiate of variable-valency metal. The method enables the production of polymers and articles therefrom possessing high physico-mechanical properties. The method is versatile and applicable to any type of polymers susceptible to oxidative destruction.

7 Claims, No Drawings

METHOD FOR STABILIZATION OF POLYMERS

The present invention relates to methods for stabilization of polymers and, more specifically, of the polymers susceptible to oxidizing destruction.

These polymers are useful in various branches of industry. They find extensive use in the manufacture of a whole range of articles, parts, structural assemblies; in the production of sealing materials, rubbers, fiber-glass plastics and polymeric coatings.

During storage, processing and use of these polymers and articles made therefrom, the majority of the polymers are subjected to oxidizing destruction, including thermo-oxidizing destruction. As a result, physico-mechanical and other working properties of the polymers and, hence, of the articles made therefrom are substantially impaired.

Under the effect of high temperatures within the range of from 300° to 400° C., the majority of polymeric materials decompose according to the radical-chain mechanism, thus resulting in a complete break-down of the article (destruction). This process is accelerated in the presence of air oxygen or other agents facilitating the formation of unstable free radicals.

Known in the art are different methods adapted to inhibit the destruction in polymers. One such method comprises incorporation, into the polymeric system, substances referred to as chain-stoppers (stabilization). Among such compounds there are antioxidants, organic complexes of metals, salts of multi-valent metals and the like compounds. As a rule, these compounds are effective to temperatures within the range of from 200° to 300° C. At higher temperatures they decompose with the formation of unstable free radicals. The latter initiate the polymer destruction process.

In the known methods for stabilization of polymers, an appropriate individual stabilizing agent is selected for a particular polymer or polymeric composition.

Therefore, basic disadvantages of the prior art methods reside in: (1) the necessity of selection of a specific stabilizing agent for each particular system or each type of polymer; (2) lack of the stabilizing effect at temperatures above 300°-350° C.; (3) possibility of initiation of the destruction process at temperatures exceeding 300° C. due to decomposition of the stabilizing agent with the formation of free radicals.

Known in the art is a method for stabilization of silicone vulcanizates by incorporating, into a rubber mix, organic salts of multi-valent metals and, more specifically, formates of cobalt, cerium, copper. In this method, after intermixing all the components, the mix is moulded and the resulting samples are subjected to heat treatment at a temperature below the decomposition temperature of the selected stabilizing agent.

The efficiency of such additives is insufficient. Thus, vulcanizates without such additives have a service life of 7 days at a temperature of 249° C. On incorporation of the additives, the vulcanizates have a service life of only 48 hours at a temperature of 315° C.; therewith, mechanical properties of the vulcanizate after thermal aging under such conditions become substantially deteriorated, i.e. its ultimate tensile strength is reduced from 600 kgf/cm² (for the vulcanizate without the stabilizing agent after thermal ageing at the temperature 249° C. for 7 days) down to 270 kgf/cm² (for the vulcanizate with the stabilizing agent after thermal aging at a temperature of 315° C. for 48 hours) and relative elongation is lowered from 80 to 50%.

In this method, despite a slight increase in thermal stability of the vulcanizate, there is observed a decrease in mechanical properties of the vulcanizate after thermal aging.

It is an object of the present invention to provide such a method for stabilization of polymers susceptible to oxidizing destruction which would make it possible to substantially elevate the working temperature of a polymer and stability thereof.

This and other objects of the present invention are accomplished by a method which comprises intermixing a polymer with a multi-valent metal formate in the amount of from 0.1 to 20 parts by weight per 100 parts by weight of the polymer, followed by a heat treatment of the resulting mixture. In accordance with the present invention said heat treatment is performed at the decomposition temperature of the selected formate of the multi-valent metal.

Polymers susceptible to thermo-oxidizing destruction belong substantially to all known classes of polymers, namely: epoxy, polyamides, polyimides, silicone, fluoroorganic polymers and copolymers based thereon.

As the formate of the multi-valent metal, use can be made of, for example, formates of iron, nickel, copper, cobalt, cerium.

It is known that incorporation, into a polymer, of salts of multi-valent metals and subsequent heat treatment of the resulting mixture at temperature below the decomposition temperature thereof results in a certain stabilizing effect. It has been expected that in the case of heat-treatment of an article at or above the decomposition temperature of the metal salt this effect should disappear. However, it has been unexpectedly found that upon incorporation of a multi-valent metal formate and subsequent heat treatment at the decomposition temperature of the formate employed, the stabilizing effect is enhanced.

This is due to the fact that as a result of decomposition of said formates there are formed zero-valence metals or oxides of lower-valent metals and a mixture of gaseous products according to the reaction:

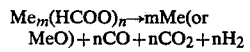

$$Me_m(HCOO)_n \rightarrow mMe(or\ MeO) + nCO + nCO_2 + nH_2$$

The resulting zero-valence metal in the polymer acts as a more effective stabilizing agent since it does not contain an oxide film and has a higher rate of interaction with oxygen than polymer. Therefore, oxygen has no access to the polymer and the latter is not subjected to the oxidizing destruction.

The salts are added in an amount of from 0.1 to 20 parts by weight per 100 parts by weight of the polymer. If the salt amount is below 0.1 part by weight, the stabilizing effect would not be so distinctly pronounced; if the salt amount is above 20 parts by weight, a great amount of gaseous products would be evolved, thus resulting in reduced physoco-mechanical properties of the final articles.

The optimal amount of the additive depends on the type of articles into which the polymer is processed.

Consequently, the method according to the present invention, as compared to the prior art ones, enables the production of polymers and articles therefrom with a higher thermal stability and longer service life. Thus, thermal stability of silicone polymers and articles therefrom is increased from 300°–350° C. up to 400°–600° C. for a long operation period and up to 1,000° C. for a short-term operation. Thermal stability of fluoroorganic copolymers is increased from 200°–250° C. to 300°–350° C. for a long-term operation and up to 400° C. for a short-term operation.

Thermal stability of polyimides, polyepoxides and other type polymers which have heat-resistance not exceeding 250° C. can be elevated to 300°–350° C. for long-term operation.

Furthermore, stability of the articles under atmospheric conditions is substantially ameliorated as well.

The stabilization method according to the present invention is universal, i.e. applicable to any type of polymers susceptible to oxidizing destruction.

The method is technologically simple and is performed in the following manner.

The stabilizing additive is incorporated during the manufacture of an article.

Heat treatment can be combined with the technological cycle of producing articles: (drying of varnish-and-paint coating, curing of fiber-glass plastic, annealing of articles from plastics to release internal strains).

In the case of manufacture of rubber articles the method is effectuated using standard equipment in the following manner. Into a rubber mix, along with other components, a multi-valent metal formate is added in an amount of from 0.1 to 5 parts by weight per 100 parts by weight of the polymer. The mixture is thoroughly intermixed, whereafter it is moulded and subjected to a heat treatment at the decomposition temperature of the selected metal formate.

In the case of producing polymeric coatings, into a polymer solution, along with other components, there is added a multi-valent metal formate preferably in an amount of from 5 to 10 parts by weight per 100 parts by weight of the polymer. The solution is thoroughly stirred, applied onto the surface being protected and dried according to the temperature schedule stipulated for the selected material, followed by heating the article to the decomposition temperature of the chosen metal formate.

In the case of producing polymer articles, the procedure is as follows. Into a finely-divided polymer or a solution thereof there is added a multi-valent metal formate in a preferable amount of from 0.1 to 15 parts by weight per 100 parts by weight of the polymer; the mixture is thoroughly stirred and then moulded using standard equipment, followed by heat-treatment at the temperature of decomposition of the selected metal formate.

For a better understanding of the present invention some specific Examples illustrating the method for stabilizing polymers are given hereinbelow.

EXAMPLES 1 THROUGH 25

Added into a polymer is formate of an appropriate multi-valent metal. The resulting mixture is thoroughly agitated and subjected to heat-treatment at the temperature of decomposition of the metal formate.

The thus-prepared mixture is subjected to a derivatographic analysis and continuous aging at a temperature of 800° C. for a short period, at a temperature of 400° C. for 200 hours and for 450 C. for 300 hours.

As the polymers use is made of the following compounds: Polytrimethylsiloxane:

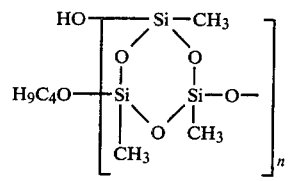

A ladder-like polymer:

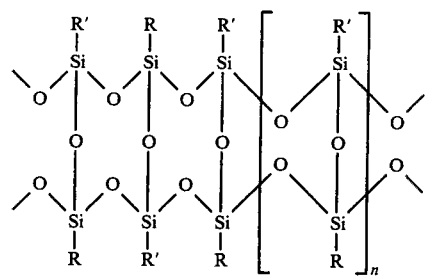

wherein
R is $CH_3$—
R' is

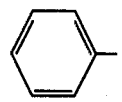

A polymer prepared from pyromellytic ether and 4,4'-diaminodiphenyl ether of the formula:

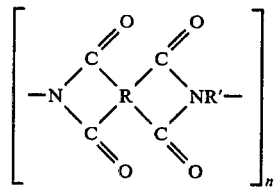

wherein
R is

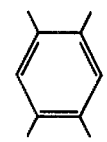

R' is

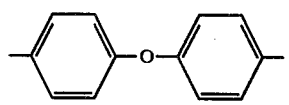

The mixture composition, temperature of the heat-treatment, results of derivatographic analysis and continuous aging data are given in Table 1 hereinbelow.

From the above-given data it is seen that during oxidizing destruction the smallest weight loss is characteristic for the polymers stabilized with the decomposition products of formates of corresponding metals thus making it possible to use said polymers for long periods of service (up to 200 hours) at a temperature of 450° C. and for a short-term service at temperatures within the range of from 500° to 800° C.

EXAMPLES 26 THROUGH 37

Into a ball mill with porcelain balls there are charged, in succession, a polytrimethylsiloxane varnish, titanium white, zinc white mica, talc, and a metal formate in the proportions shown in Table 2 and mixed for a period of from 18 to 25 hours. The resulting composition is diluted with toluene to a working viscosity and applied, by means of a paint-sprayer onto samples of the laminated plastic.

TABLE 1

| Example No. 1 | Polymer 2 | Variable valency metal formate 3 | Temperature of the mixture treatment 4 | Amount of the multivalent metal formate, parts by weight 5 | Weight losses of the polymer, percent by weight | | | | | |
|---|---|---|---|---|---|---|---|---|---|---|
| | | | | | According to the derivatographic analysis at the temperature, °C. | | | | under continuous aging at the temperature, °C. | |
| | | | | | 400 6 | 500 7 | 600 8 | 800 9 | 400 200 hrs 10 | 450 300 11 |
| 1 | Polytrimethylsiloxane | — | — | — | 0.5 | 1.5 | 5.0 | 10.2 | 12 | 18 |
| 2 | Polytrimethylsiloxane | iron formate | 300 | 0.1 | 0 | 0 | 2.1 | 6.0 | 6.1 | 8.2 |
| 3 | Polytrimethylsiloxane | iron formate | 300 | 5 | 0 | 0 | 1.5 | 3.1 | 6.0 | 8.1 |
| 4 | Polytrimethylsiloxane | iron formate | 300 | 20 | 0 | 0 | 0 | 1.5 | 5.0 | 7.1 |
| 5 | Polytrimethylsiloxane | cobalt formate | 300 | 0.1 | 0 | 0 | 2.8 | 6.7 | 6.9 | 9.0 |
| 6 | Polytrimethylsiloxane | cobalt formate | 300 | 20 | 0 | 0 | 0 | 1.9 | 6.3 | 8.3 |
| 7 | Polytrimethylsiloxane | copper formate | 150 | 0.1 | 0 | 0.5 | 3.0 | 6.9 | 7.0 | 10.3 |
| 8 | Polytrimethylsiloxane | copper formate | 150 | 5 | 0 | 0 | 2.7 | 3.9 | 6.9 | 9.8 |
| 9 | Polytrimethylsiloxane | nickel formate | 300 | 0.1 | 0 | 0.6 | 3.2 | 6.9 | 7.1 | 10.5 |
| 10 | Polytrimethylsiloxane | nickel formate | 300 | 10 | 0 | 0 | 2.1 | 4.0 | 7.0 | 10.5 |
| 11 | Polymethylphenylsiloxane | — | — | — | 5.1 | 7.2 | 23.0 | 30.9 | 32.0 | 42.5 |
| 12 | Polymethyphenylsiloxane | iron formate | 300 | 1 | 0 | 3.6 | 12.3 | 15.9 | 17.0 | 20 |
| 13 | Polymethyphenylsiloxane | iron formate | 300 | 20 | 0 | 0 | 8.3 | 10.9 | 10.2 | 20 |
| 14 | Polymethylphenylsiloxane | cobalt formate | 300 | 1 | 0 | 4.0 | 10.9 | 17.2 | 20.0 | 22 |
| 15 | Polymethylphenylsiloxane | cobalt formate | 300 | 20 | 0 | 0 | 9.3 | 11.2 | 21.1 | 25 |
| 16 | Ladder-like polymer | — | — | — | 0.5 | 2.0 | 10.9 | 28.0 | 33.2 | 40.2 |
| 17 | Ladder-like polymer | iron formate | 300 | 15 | 0 | 0 | 5.2 | 10.2 | 9.5 | 20 |
| 18 | Ladder-like polymer | cobalt formate | 300 | 5 | 0 | 0 | 8.2 | 19.3 | 10.2 | 21 |
| 19 | Ladder-like polymer | cobalt formate | 300 | 15 | 0 | 0 | 5.3 | 16.2 | 9.9 | 20 |
| 20 | Polybenzimidazole | — | — | — | 0 | 3.1 | 23.2 | 48.5 | — | — |
| 21 | Polybenzimidazole | iron formate | 300 | 5 | 0 | 0 | 12.3 | 30.6 | — | — |
| 22 | Copolymer of trifluorochloroethylene with vinylidenefluoride | — | — | — | 2 | 100 | — | — | — | — |
| 23 | Copolymer of trifluorochloroethylene with vinylidenefluoride | iron formate | 300 | 5 | 1 | 50 | 100 | — | — | — |
| 24 | Graphitized polymer based on acrylonitrile copolymer | — | — | — | 10.2 | 20.9 | 30.1 | 50.0 | — | — |
| 25 | Graphitized polymer based on acrylonitrile copolymer | iron formate | 300 | 5 | 0 | 2.7 | 3.7 | 5.4 | — | — |

TABLE 2

| Example No. | Composition of the coating (parts by weight) stabilized with metal formate and non-stabilized one | | | | | | | |
|---|---|---|---|---|---|---|---|---|
| | Polytrimethyl-siloxane resin, parts by weight | Titanium white parts by weight | Zinc white, parts by weight | Mica, parts by weight | Talc, parts by weight | Multi-valent metal formate, parts by weight | | |
| | | | | | | Fe | Co | Cu |
| 26 | 100 | — | — | — | — | — | — | — |
| 27 | 98 | — | — | — | — | 2 | — | — |
| 28 | 90 | — | — | — | — | 10 | — | — |
| 29 | 30 | 40 | 10 | 10 | 10 | — | — | — |
| 30 | 40 | 30 | 7 | 8 | 15 | — | — | — |
| 31 | 30 | 40 | 9 | 10 | 10.1 | 0.9 | — | — |
| 32 | 35 | 35 | 9 | 10 | 9 | 2 | — | — |
| 33 | 30 | 40 | 7 | 10 | 8.5 | 4.5 | — | — |
| 34 | 30 | 40 | 9 | 10 | 9 | — | 2 | — |
| 35 | 30 | 40 | 8 | 10 | 9 | — | — | 3 |
| 36 | 40 | 30 | 7 | 8 | 13 | — | 2 | — |
| 37 | 40 | 30 | 7 | 8 | 11 | 4 | — | — |

The coated samples are then dried according to the following temperature schedule: 4 hours at the temperature of 100° C., whereafter temperature is raised to 200° C. and the samples are maintained at this temperature for 6 hours; then temperature is brought to 300° C. and heat treatment at this temperature lasts for 4 hours.

Thereafter, the coated sample is subjected to a long-term thermal aging: in one case at a temperature of 450° C. for 200 hours and in other case at a temperature of 600° C. for 50 hours the samples are then placed into a humidity chamber with $\phi=98\%$. Simultaneously subjected to thermal aging and effect of humidity are samples of the laminated plastic but without coating and humidity protection coefficient K is determined which is equal to the ratio of the humidity absorption of the sample without coating (g/m$^2$) to the humidity absorption value of the coated sample. If K is above 1, the coating retains its water-protective properties. The test results are shown in Table 3 hereinbelow.

TABLE 3

| Example No. 1 | The coating appearance after thermal aging at 450° C. for 200 hours 2 | The coating appearance after thermal aging at 600° C. for 50 hours 3 | Humidity protection coefficient of the coating at $\phi = 98\%$ | | The coating appearance after exposure to a quartz lamp irradiation for 6 months 6 |
|---|---|---|---|---|---|
| | | | 450° C. for 200 hours 4 | 600° C. for 50 hours 5 | |
| 26 | Cracking of the coating over the entire sample surface | Scaling of the coating over the entire sample surface | Impossibility of determination: the coating is completely cracked | | — |
| 27 | Network of small cracks | Scaling of the coating over the entire sample surface | 0.8 | Impossible to determine; the coating is cracked | — |
| 28 | Network of small cracks | Scaling of the coating over the entire sample surface | 0.9 | Impossible to determine; the coating is cracked | — |
| 29 | No changes | Cracking of the coating over the entire sample surface | 1.0 | 0.5 | Strong whitening over the entire surface |
| 30 | No changes | Cracking of the coating over the entire sample surface | 1.2 | 0.5 | |
| 31 | No changes | No changes | 4.8 | 1.9 | Slight whitening |
| 32 | No changes | No changes | 4.9 | 2.1 | No changes |
| 33 | No changes | No changes | 4.9 | 2.9 | No changes |
| 34 | No changes | No changes | 5.0 | 2.5 | No changes |
| 35 | No changes | No changes | 3.9 | 2.0 | No changes |
| 36 | No changes | No changes | 4.9 | 1.8 | No changes |
| 37 | No changes | No changes | 4.8 | 2.0 | No changes |

From the data of the foregoing Table 3 it is seen that incorporation of formate of a metal selected from the group consisting of iron, cobalt, copper, into the coating composition and heat-treatment at the temperature of 600° C. result in a substantial increase in thermal stability and water-resistance of the coating. At the same time, the coatings based on the same varnish but without the formate are cracked at the same temperature and reveal no water-proof properties. Furthermore, the weather-resistance of the coating increases, since on irradiation with a quartz lamp the coating with the stabilizing agent exhibits practically no whitening, whereas the coating without the stabilizing agent is subjected to strong whitening.

EXAMPLES 38 TO 40

To a rubber mix consisting of 100 parts by weight of polymethylsiloxane rubber, 35 parts by weight of a filler, i.e. aerosil, 8 parts by weight of methylphenyldimethoxysilane and 0.2 part by weight of dicumyl peroxide a multi-valent metal formate is added. The mixture is then moulded into plates with a thickness of 2 mm and subjected to formate heat treatment at the decomposition temperature of iron formate, i.e. 300° C., for the period of 2 hours. From the thus-produced plates there are manufactured samples for tests for ultimate tensile strength $\sigma$ and relative elongation $\Delta L$. Said samples are subjected to lasting thermal aging at a temperature of 350° C. for a period of 50 hours and at a temperature of 400° C. for 5 hours.

The test results are shown in the following Table 4.

TABLE 4

| Example No. | multi-valent metal formate | Quantity of the multivalent metal formate, parts by weight | Properties of vulcanizates after thermal aging | | | | Properties of vulcanizates prior to the thermal aging | |
|---|---|---|---|---|---|---|---|---|
| | | | 350° C. for 50 hours | | 400° C. for 5 hours | | | |
| | | | $\sigma$ | $\Delta L$ | $\sigma$ | $\Delta L$ | $\sigma$ | $\Delta L$ |
| 38 | No stabilizer | — | 0 | 20 | 0 | 0 | 80 | 220 |
| 39 | Iron formiate | 1 | 70 | 140 | 40 | 110 | 100 | 250 |
| 40 | Iron formiate | 5 | 75 | 140 | 48 | 105 | 100 | 250 |

It is seen from the data given in the foregoing Table 4 that in the case of using metal formates properties of the starting vulcanizates are substantially ameliorated, including increase of their thermal stability: the vulcanizates retain their physico-mechanical properties after thermal aging at temperatures above 400° C., whereas the starting vulcanizate is broken.

What is claimed is:

1. A method for stabilizing polymers susceptible to oxidative destruction which comprises intermixing a homopolymer or copolymer selected from the group consisting of epoxies, polyamides, polyimides, silicones and fluoroorganic polymers with a multi-valent metal formate in an amount ranging from 0.1 to 20 parts by weight per 100 parts by weight of the polymer, heat-treating the polymer-formate mixture at the decomposition temperature of the multi-valent metal formate for a time sufficient to completely decompose said formate.

2. The method of claim 1, wherein said polymer is an epoxy.

3. The method of claim 1, wherein said polymer is a polyamide.

4. The method of claim 1, wherein said polymer is a polyimide.

5. The method of claim 1, wherein said polymer is a silicone.

6. The method of claim 1, wherein said polymer is a fluoroorganic polymer.

7. A method for stabilizing silicone polymers susceptible to oxidative destruction which comprises contacting said polymer with a multi-valent metal formate in an amount ranging from 0.1 to 20 parts by weight per 100 parts by weight of the polymer, heat-treating the thus formed polymerformate mixture at the decomposition temperature of the multi-valent metal formate for a time sufficiently to completely decompose said formate.

* * * * *